May 13, 1952 N. C. McBIRNEY 2,596,159
COOKY MOLDING CUTTER
Filed Aug. 25, 1948
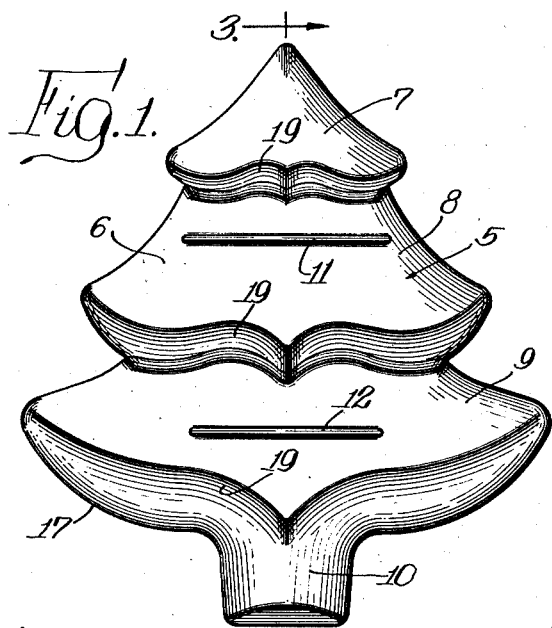
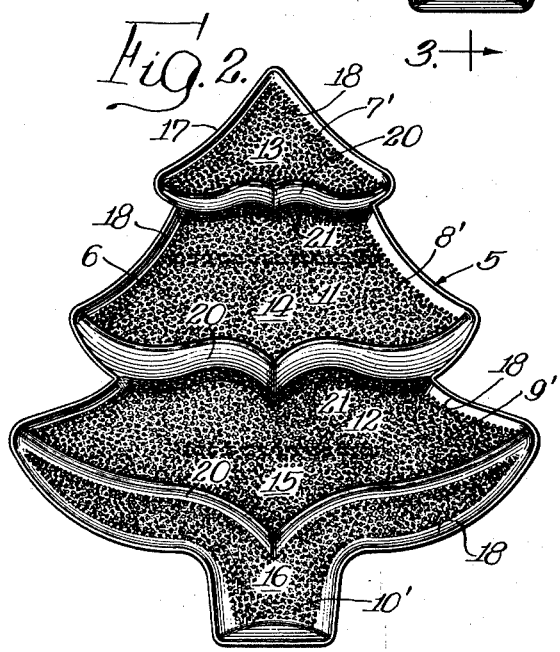
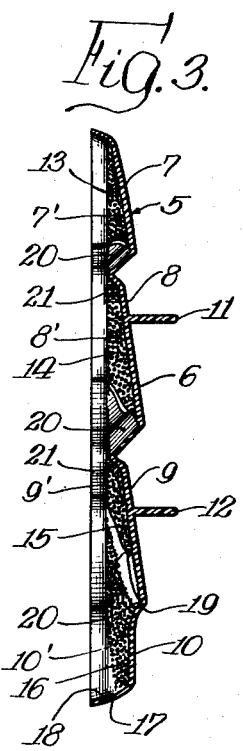
INVENTOR.
Nettie C. McBirney,
BY
Andrew F. Wintercorn
Atty.

Patented May 13, 1952

2,596,159

UNITED STATES PATENT OFFICE 2,596,159

COOKY MOLDING CUTTER

Nettie C. McBirney, Tulsa, Okla.

Application August 25, 1948, Serial No. 46,032

1 Claim. (Cl. 107—47)

This invention relates to a new and improved cookie molding cutter.

Cookie cutters as heretofore designed have been objectionable because nothing was done to overcome the tendency for the dough to stick to the walls of the cavity in the cutter, and this difficulty was usually increased in most cases by making little or no allowance whatsoever for "draw." As a result, and as could be expected, the housewife found it hard to get cookies out of these cutters. Furthermore, the majority of these prior devices were simply cutters; that is, they were not designed to do a molding job and did not give much, if any, surface configuration or shape to the cookies. It is, therefore, the principal object of my invention to provide a cookie molding cutter which is designed to avoid the aforementioned objections.

A salient feature of my improved cookie molding cutter is the provision of a pebbled or stippled internal surface for the mold cavity, with a view to the pocketing of sufficient flour and/or air in a fine film between the cookie and the mold in order to overcome the tendency for sticking and accordingly insure release of the cookie more easily.

Another feature is the provision of a cutter in which the cavity is conformed to mold the face of the cookie, as desired, and in which allowance for "draw" is made at all points, so as to insure easy freeing of the molded cookie from the mold cavity.

The invention is illustrated in the accompanying drawing, in which—

Fig. 1 is a front view of a cookie molding cutter made in accordance with my invention;

Fig. 2 is a rear view, showing the pebbled or stippled internal surfaces on all flat or face surfaces, namely, all but the marginal walls and other surfaces relative to which lateral draw must occur in the removal of the molded cookie dough, and Fig. 3 is a longitudinal section on line 3—3 of Fig. 1.

The same reference numerals are applied to corresponding parts in these three views.

Referring to the drawing, the reference numeral 5 designates the cookie molding cutter of my invention as a whole, the body 6 of which is preferably, although of course not necessarily, molded in one piece of plastic material to the general shape of the particular design of cookie to be molded therewith, the one shown being for a cookie of Christmas tree design, portions 7, 8 and 9 representing generally the foliage of the tree and portion 10 representing generally the trunk. Molded integral with the body 6 of the cutter 5 and projecting from the back thereof in substantially parallel relation are ears 11 and 12, which are intended for use as finger grips in the handling of the cutter in molding and cutting cookie dough. The operator rests the tip of the thumb against the ear 12 and the index and middle finger against the longer ear 11, when tapping the cutter lightly against the table top or pastry cloth to free the freshly molded cookie, and the cutter is supported in one hand by means of these ears while the dough, which has just been cut out from a rolled piece of cookie dough, is pressed lightly into the cavities 7' to 10' to insure the desired sharply defined configuration of all details of the cookie design.

The body 6 is molded to substantially uniform wall thickness throughout, for economy and lightness as well as nice appearance, the external appearance of the cutter, as shown in Fig. 1, corresponding very closely to the design of the cookie produced with this cutter and being only a trifle larger than the cookie, the difference in dimensions being represented by the wall thickness. The substantially flat internal surfaces 13—16 of the body 6 are purposely made rough, being pebbled or stippled with a view to the entrapment or pocketing of sufficient flour and/or air in a fine film between the molded cookie dough and the mold cavity, in order to overcome the tendency for the dough to stick and, accordingly, insure easy release of the cookie from the cutter. The marginal or peripheral flange 17, which cuts the dough to the final outline desired, has some portions of its circumferential length at an angle of approximately forty-five degrees (45°) to the plane of the body 6, and has other portions at smaller angles, as clearly appears at the opposite ends of the section Fig. 3, and the inner surface 18 of this flange is smooth. The transversely extending walls 19 between the portions 7, 8, 9, and 10 are also inclined with respect to the general plane of the body 6 at angles of between thirty degrees (30°) and fifty degrees (50°), and the inside surfaces 20 of these inclined walls are also smooth. In that way, all portions of the cutter body 6, the surfaces of which must move laterally with respect to the surfaces of the freshly molded cookie dough in the dropping of the cookie, being smooth, offer no resistance to the release of the cookie, and, inasmuch as all of the rest of the internal surfaces, which represent the major portion of the total area of the cookie, as clearly appears in Fig. 2, have the pebbled or stippled finish, for the purpose already mentioned, it follows that the housewife will not experience any difficulty in getting the cookies out of this cutter. It, of course, goes without saying that this idea may be applied to a large variety of designs of cookie molding cutters; that is, it is not to be regarded as in any way limited to the specific tree design herein shown, this being only one of many designs that could have been illustrated. In passing, attention is called in Figs. 2 and 3 to the beveled upper edge portions 21 on the larger stippled areas 14 and 15. These beveled edge portions cooperate with the peripheral flange 17 and the walls 19 defining the lower edges of these areas to form pockets to insure the entrapment of enough flour and/or air in the operation of the cutter to make certain that the cookie will drop out freely.

In operation, the properly prepared cookie dough is rolled to the appropriate thickness, the same as in the use of conventional cookie cutters, and then the cutter is pressed into the dough to cut out a section having the outline of the cookie to be produced, the operator in this initial operation using the ears 11 and 12 as finger grips, as previously mentioned. Then the cutter with the dough in it is picked up by means of the finger grips 11 and 12 and, while the cutter is supported in one hand by the finger grips 11—12, the dough is pressed gently into the mold cavities 7'—10' with the thumb and fingers of the other hand, to be sure that the dough conforms throughout to the shape of the mold cavities, so that all details of the tree, or other design, will be sharply outlined. Then the cookie can be dropped out by tapping one edge portion of the cutter lightly against the table top or pastry cloth.

It is believed the foregoing description conveys a good understanding of the objects and advantages of my invention. The appended claim has been drawn to cover all legitimate modifications and adaptations.

I claim:

A cookie molding cutter adapted to be pressed into a sheet of cookie dough to cut out from the sheet and at the same time roughly shape a cookie blank, said cutter comprising a one-piece molded plastic body of dished form providing a shallow mold cavity defined by a wall of the same general profile as the cookie blank to be cut out, and a continuous peripheral flange extending downwardly and outwardly from the edges of said wall, the wall being formed to provide fairly flat surfaces in planes disposed in transverse relationship to the peripheral flange and adapted to give a corresponding shape to the top surface of the cookie blank, the inner surface of the flange being smooth but the flat inner surfaces on the wall having an all-over stippled finish of a finely pebbled form, whereby a fine film of flour and air is pocketed between the flat surfaces on said wall and the dough sufficient to insure easy release of the molded cookie from the cutter even though the cookie blank cut out by the peripheral flange has been pressed into the mold cavity to make the blank conform accurately to the shape of the mold cavity.

NETTIE C. McBIRNEY.

REFERENCES CITED

The following references are of record in the file of this patent:

UNITED STATES PATENTS

| Number | Name | Date |
| --- | --- | --- |
| 360,753 | Bailey | Apr. 5, 1887 |
| 534,071 | Mitchell | Feb. 12, 1895 |
| 627,429 | Lawbaugh | June 20, 1899 |
| 782,615 | Manning | Feb. 14, 1905 |
| 1,455,780 | Corwin | May 22, 1923 |
| 1,892,779 | Cole | Jan. 3, 1933 |
| 1,963,878 | Bagby | June 19, 1934 |
| 2,139,825 | Hunt | Dec. 13, 1938 |
| 2,205,842 | Butman | June 25, 1940 |
| 2,228,335 | Allen | Jan. 14, 1941 |